US012722954B1

(12) United States Patent
Alsoliman

(10) Patent No.: US 12,722,954 B1
(45) Date of Patent: Sep. 1, 2026

(54) ELECTROMAGNETIC LIFTING AND TRANSPORT DEVICE AND METHODS OF USE THEREOF

(71) Applicant: KING SAUD UNIVERSITY, Riyadh (SA)

(72) Inventor: Majed Abdullah Alsoliman, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 19/448,562

(22) Filed: Jan. 14, 2026

(51) Int. Cl.
*B66F 9/18* (2006.01)
*B66F 9/075* (2006.01)
*B66F 17/00* (2006.01)

(52) U.S. Cl.
CPC .......... *B66F 9/182* (2013.01); *B66F 9/07595* (2013.01); *B66F 17/00* (2013.01); *B66F 2700/04* (2013.01); *B66F 2700/05* (2013.01)

(58) Field of Classification Search
CPC .. B66F 7/065; B66F 9/065; B66F 9/06; B66F 9/061; B66F 9/182; B66F 9/07595; B66F 9/07522; B66F 9/07513; B66F 9/12; B66F 9/122; B66F 9/127; B66F 9/14; B66F 9/24; B66F 9/205; B66F 17/00; B66F 2700/04
USPC .... 414/785, 495, 496, 606; 254/20, 84, 7 R, 254/7 C
See application file for complete search history.

(56) References Cited

U.S. PATENT DOCUMENTS

| | | | | |
|---|---|---|---|---|
| 3,289,836 | A * | 12/1966 | Weston | B03C 1/253 209/214 |
| 3,646,613 | A | 2/1972 | Matsumoto et al. | |
| 5,623,241 | A | 4/1997 | Minkoff | |
| 6,485,247 | B1 | 11/2002 | Groves et al. | |
| 9,120,622 | B1 * | 9/2015 | Elazary | B66F 9/07 |
| 11,730,659 | B1 | 8/2023 | Kennedy | |
| 12,012,319 | B2 | 6/2024 | Krumenacker | |
| 2004/0265113 | A1 | 12/2004 | Quinlan, Jr. et al. | |
| 2006/0160684 | A1 * | 7/2006 | Springston | B30B 15/028 483/1 |
| 2012/0237326 | A1 | 9/2012 | Van Ness | |
| 2020/0391986 | A1 | 12/2020 | Picha | |
| 2021/0155464 | A1 * | 5/2021 | Takai | B66F 9/12 |
| 2024/0316820 | A1 * | 9/2024 | Jin | B02C 18/24 |

(Continued)

*Primary Examiner* — Glenn F Myers
(74) *Attorney, Agent, or Firm* — Nath, Goldberg & Meyer; Joshua B. Goldberg

(57) ABSTRACT

An electromagnetic lifting and transport device for metallic loads is disclosed. An upper member having at least one electromagnet is configured to magnetically engage and support a metallic load. A lower member is configured for movement along a support surface, and a lifting mechanism extends between the upper and lower members. The lifting mechanism raises and lowers the upper member relative to the lower member while the electromagnet supports the load. A base supported by the lower member is movable between a stowed position and a deployed position beneath the load. Once the load is magnetically lifted, the base is deployed and the load is lowered thereon such that it is mechanically supported without continued magnetic engagement. The device permits safe lifting and transport of metallic objects without manual insertion of lifting elements beneath the load, and reduces reliance on continuous electrical power during transport.

20 Claims, 5 Drawing Sheets

(56) References Cited

U.S. PATENT DOCUMENTS

| | | | | |
|---|---|---|---|---|
| 2024/0327185 | A1* | 10/2024 | Wanaka | B66F 9/07559 |
| 2025/0348088 | A1* | 11/2025 | Rosencrance | B60K 1/00 |

* cited by examiner

ELECTROMAGNETIC LIFTING AND TRANSPORT DEVICE AND METHODS OF USE THEREOF

BACKGROUND

Field

The present disclosure generally relates to material handling equipment, and more particularly to portable lifting and transport devices for metallic loads as may be used in warehouses, workshops, shipyards, industrial maintenance environments, and other locations where overhead lifting equipment may not be available or practical.

Description of Related Art

In many industrial, construction, and maintenance environments, heavy metallic objects must be lifted from ground level and transported over short distances. Conventional lifting solutions such as cranes, hoists, or forklifts may be unavailable, impractical, or dangerous in confined spaces, low-ceiling facilities, or crowded work areas. Forklift forks and similar tools are also difficult to insert underneath objects that are closely engaged with the floor or ground surface, making initial lifting both labor-intensive and hazardous.

Electromagnetic lifting devices exist, but these systems typically suspend a load continuously from the magnet during transport. Continuous suspension requires uninterrupted electrical power and creates a risk of load release in the event of a power failure. Likewise, mobile dollies and mechanical lifting carts require manual positioning of supports under the object before lifting, or they depend on rigid lifting arms that are not easily inserted beneath a grounded load.

Accordingly, there is a need for a portable lifting and transport device capable of temporarily raising a metallic object without manual insertion of lifting elements beneath it, and then transferring the elevated object onto a mechanical support structure that safely carries the load without the need for continuous magnetic engagement. The present disclosure provides an electromagnetic lifting and transport device, and methods of use thereof, addressing the aforementioned problems.

SUMMARY

The present disclosure provides a portable lifting and transport device for metallic loads. In one aspect, the device includes an upper member and a lower member spaced apart from one another, with a lifting mechanism extending therebetween. The upper member includes at least one electromagnet configured to magnetically engage and temporarily support a weighted metallic load. The lower member includes means such as wheels, castors, rollers, sliders, or a track or rail system for movement along a support surface, thereby permitting the device to be moved manually or by powered propulsion.

The lifting mechanism is configured to raise or lower the upper member relative to the lower member while the electromagnet is actively supporting the metallic load. Once elevated, a base supported by the lower member is transitioned from a stowed position to a deployed position beneath the load. The elevated load is then lowered onto the base so that the load is mechanically supported by the device, allowing the electromagnet to be deactivated while maintaining secure support of the load for transport.

In some embodiments, the upper and lower members each have a generally U-shaped configuration that embraces the load. The upper member may include a first upper member, a second upper member, and a transverse upper member extending therebetween. An adjustment mechanism may be provided to vary the spacing between the first upper member and the second upper member to improve engagement with differently sized metallic loads. In addition, the lower member may include means for allowing lateral movement of the lifting mechanism, corresponding to the adjustment of the first upper member and the second upper member.

The upper member may further include a plurality of slots, recesses, or receiving features for holding multiple electromagnets. Each electromagnet may be positioned within a magnetic cup formed of a nickel-iron soft ferromagnetic alloy, i.e. a Mu-metal, which confines magnetic flux and increases lifting efficiency. Each electromagnet may include a cooling assembly having cooling fins, a fan, or other thermal control components to reduce heat buildup during operation. Safety features such as thermal protection circuits and emergency stop switches may be incorporated to interrupt electrical power to the electromagnets when a predetermined operating condition is exceeded.

The lifting mechanism may include a screw-driven actuator powered by a motor, or alternatively, a hydraulic or pneumatic actuator. The lifting mechanism is guided between the upper and lower members to provide stable vertical motion during lifting and lowering.

The base may include a plurality of hinged plates extending between the first lower member and the second lower member. Link members between adjacent plates permit retraction and extension of the plates forming the base, thereby allowing the base to move between a stowed and deployed position. In other embodiments, manually insertable support bars received in openings in the lower member may form the base.

Another aspect of the disclosure provides a method for lifting and transporting a metallic load. The method includes positioning the lifting and transport device adjacent a metallic load, activating at least one electromagnet to magnetically engage the metallic load, and raising the upper member, engaged with the load, relative to the lower member using the lifting mechanism. A base supported by the lower member is then extended beneath the elevated load, and the load is lowered onto the base. The device may then be moved over a support surface, via means for movement within the lower member, to transport the load while the load is mechanically supported without requiring continued magnetic suspension. These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1A:
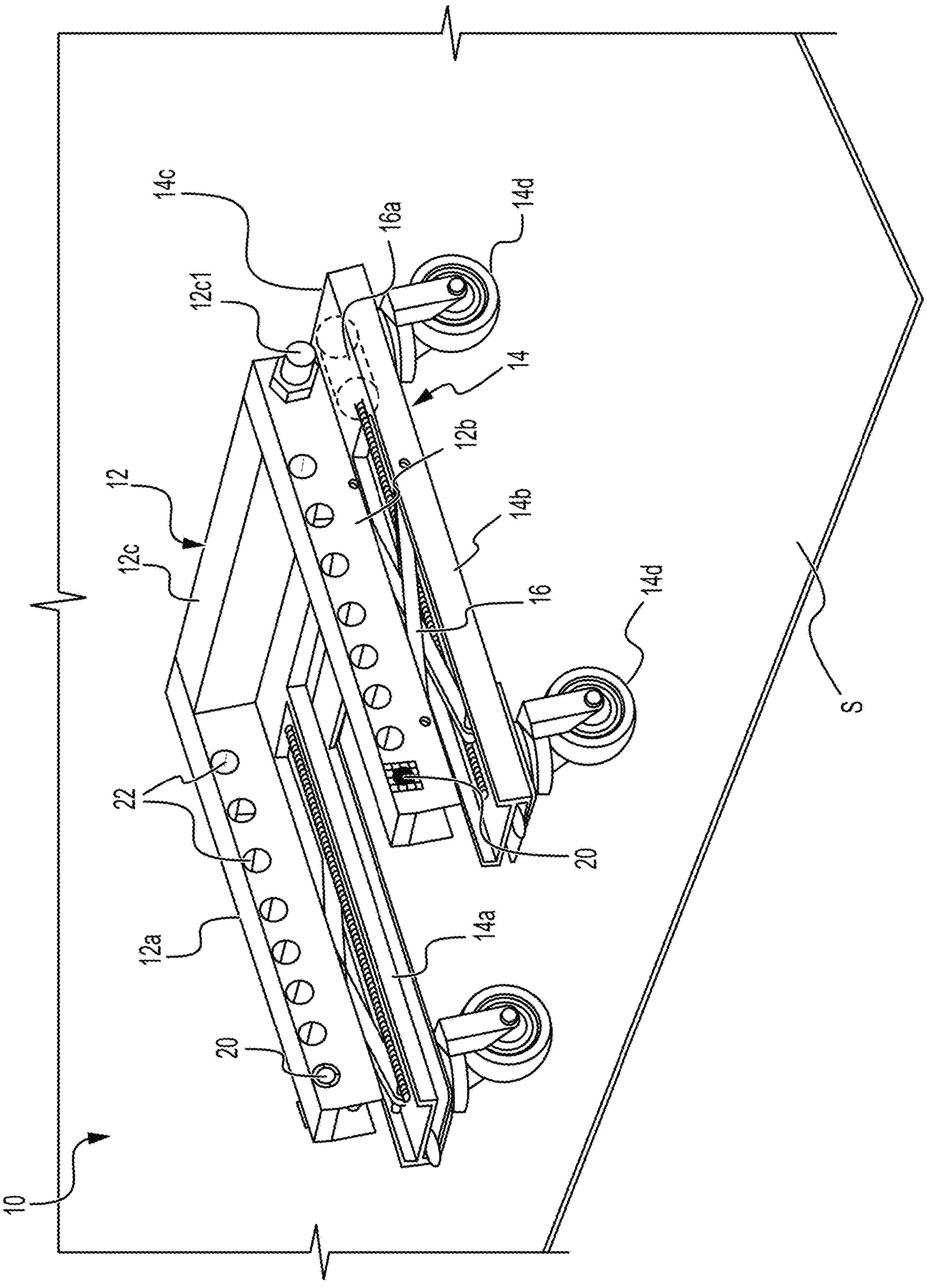
FIG. 1A is a perspective view of an electromagnetic lifting and transport device.

Referring now to FIG. 1A, a lifting and transport device 10 is illustrated. The device 10 includes an upper member 12, a lower member 14, and a lifting mechanism 16 extending between the upper member 12 and the lower member 14. The upper member 12 includes a first upper member 12*a*, a second upper member 12*b*, and transverse upper member 12*c*, which together generally define a U-shaped configuration sized to at least partially surround a metallic load when the load is positioned therebetween. The transverse upper member 12*c* may further include an adjustment mechanism 12*cl* configured to provide small variations in the separation between the first upper member 12*a* and the second upper member 12*b* so as to increase or improve contact with different load geometries.

The upper member 12 further includes at least one electromagnet 20. In the embodiment shown, two electromagnets 20 are arranged within first upper and second upper members 12*a* and 12*b* and may be retained in a plurality of slots 22 formed in the upper member 12. Each electromagnet 20 may be individually powered or controlled and may be configured to magnetically engage a weighted metallic load (see FIGS. 3A-3B).

The lower member 14 is positioned beneath the upper member 12 and may likewise define a U-shaped footprint. The lower member 14 includes a first lower member 14*a*, a second lower member 14*b*, and a transverse lower member 14*c*, each of which may be formed from a rigid structural material such as steel, aluminum, stainless steel, or alloys thereof. The lower member 14 is supported by means 14*d* for movement along a support surface. Means 14*d* is shown as wheels but could also include castors, rollers, sliders, skids, or the use of tracks, rails, and combinations thereof to permit the device 10 to be moved along a support surface S either manually or by powered equipment.

A lifting mechanism 16 extends between upper member 12 and lower member 14 and is configured to raise or lower the upper member 12 relative to the lower member 14 while the upper member 12 is magnetically engaged with a load. The lifting mechanism 16 may be implemented as a screw-driven actuator powered by a motor 16*a*, as shown, or may alternatively include a hydraulic or pneumatic actuator. Movement may be limited or guided by mechanical stops, tracks, rails, or linear guides to stabilize the vertical lifting motion.

Figure 1B:
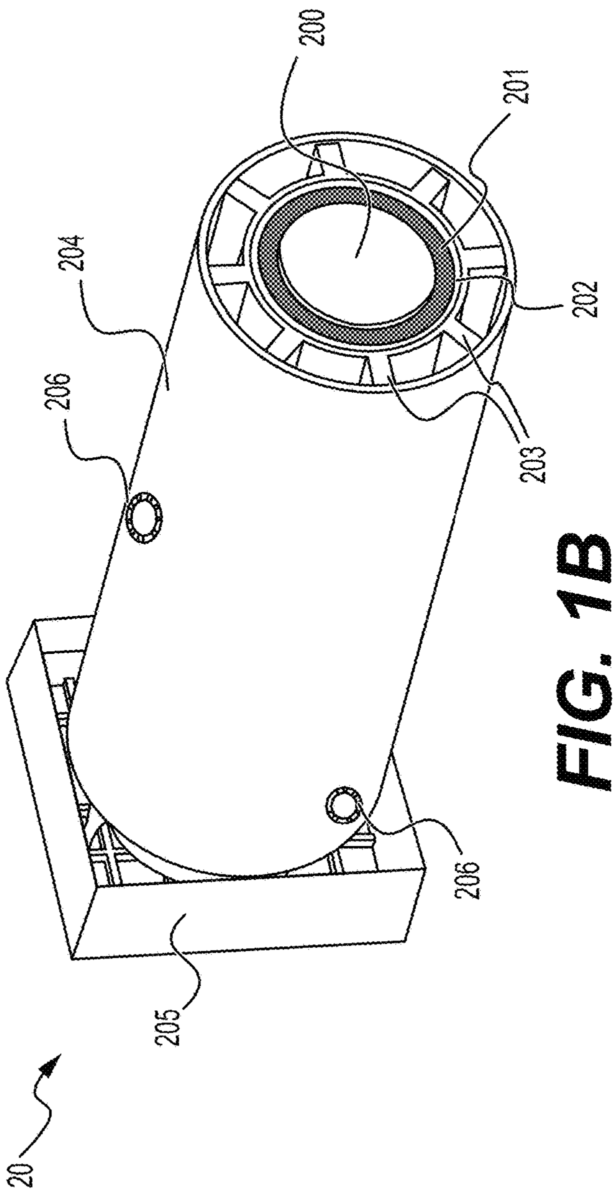
FIG. 1B is a perspective view of an electromagnet for use with the device of FIG. 1A.

FIG. 1B illustrates an embodiment of an electromagnet 20 configured for use with the lifting and transport device described herein. The electromagnet 20 includes a central magnetic core 200 containing electrical windings and associated components necessary to generate a magnetic field when energized. An insulation layer 201 is positioned adjacent the magnetic core 200 to electrically and thermally isolate the magnetic core 200 and windings therein from surrounding components. Surrounding the insulation layer 201 is a magnetic cup 202 formed of Mu-metal (a nickel-iron soft ferromagnetic alloy), configured to contain, direct, and concentrate the magnetic flux generated by magnetic core 200 toward an engagement surface with a load (e.g. the face of magnetic core 200, shown), while reducing stray magnetic fields. A plurality of cooling fins 203 are arranged radially to increase surface area and promote heat dissipation during operation. The cooling fins 203 are enclosed at least partially by an outer jacket 204, which provides structural support and protection for the internal components. A cooling fan 205 is positioned at one end of the electromagnet 20 and is configured to direct airflow over the cooling fins 203 and through the interior of the outer jacket 204 to reduce thermal buildup during sustained or high-load operation. One or more openings 206 for electrical contacts may be provided to permit an electrical connection between the electromagnets 20 and internal wiring or power circuitry, which may be within the upper member (discussed in FIG. 4), thereby enabling selective energization and control of the electromagnet 20.

Figure 1C:
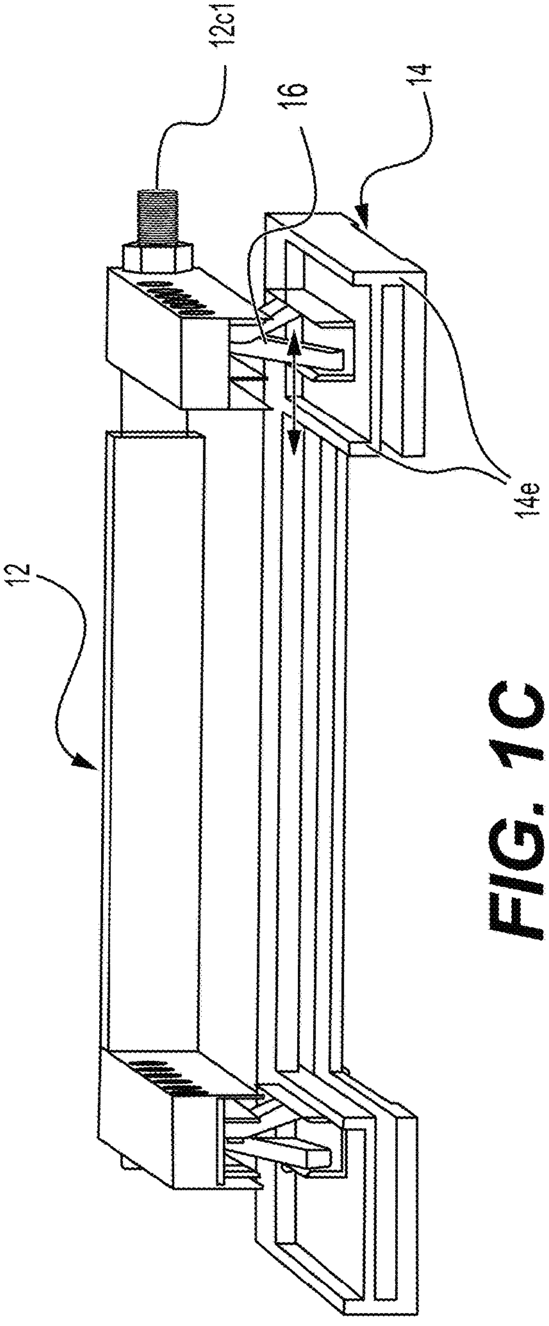
FIG. 1C is a perspective front view of the device of FIG. 1A showing means for adjustment of an upper member and means for lateral movement of a lifting mechanism.

Turning to FIG. 1C, an embodiment is illustrated of the lifting and transport device in which the upper member 12 includes an adjustment means 12*cl* configured to vary the lateral spacing or alignment of the upper member 12 relative to a load. In the illustrated embodiment, the adjustment means 12*cl* is shown as a threaded or screw-driven mechanism coupled to the upper member 12, although other linear adjustment mechanisms may be used, such as lead screws, ball screws, rack-and-pinion mechanisms, linear actuators, telescoping members, or sliding rail assemblies to name a few. The figure further illustrates means 14*e* formed in the lower member 14 allowing for lateral movement of the lifting mechanism 16 relative to the lower member 14. In the embodiment shown, means 14*e* is a generally a smooth surface upon which the lifting mechanism 16 is configured to slide laterally as the spacing of the upper member 12 is adjusted. However, it should be understood that the lateral movement of the lifting mechanism 16 is not limited to a smooth sliding surface, and in other embodiments the lifting mechanism 16 may be mounted on sliding supports, linear bearings, rails, tracks, a carriage assembly, or similar structures configured to permit controlled lateral translation relative to the lower member 14.

Figure 2A:
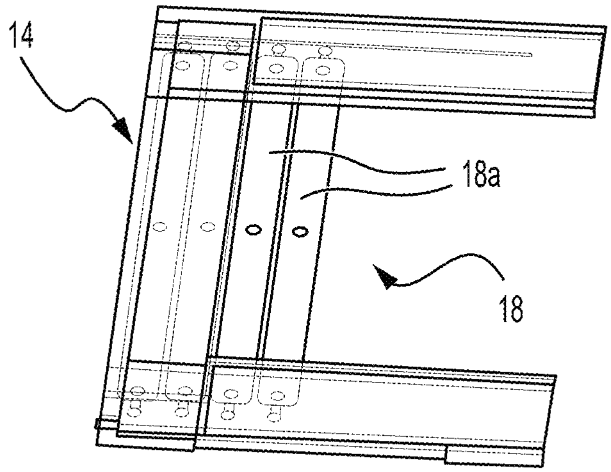
FIG. 2A is a top perspective view of a lower member of the device of FIG. 1A, in which the base is in a stowed position with the lower member.

Referring now to FIG. 2A, a base 18 is provided within grooves formed in the lower member 14. Base 18 is movable between a stowed position (FIG. 2A) in which the base is closely arranged within the interior of the lower member 14 and a deployed position, shown in FIG. 2B, in which the base is fully extended.

Figure 2B:
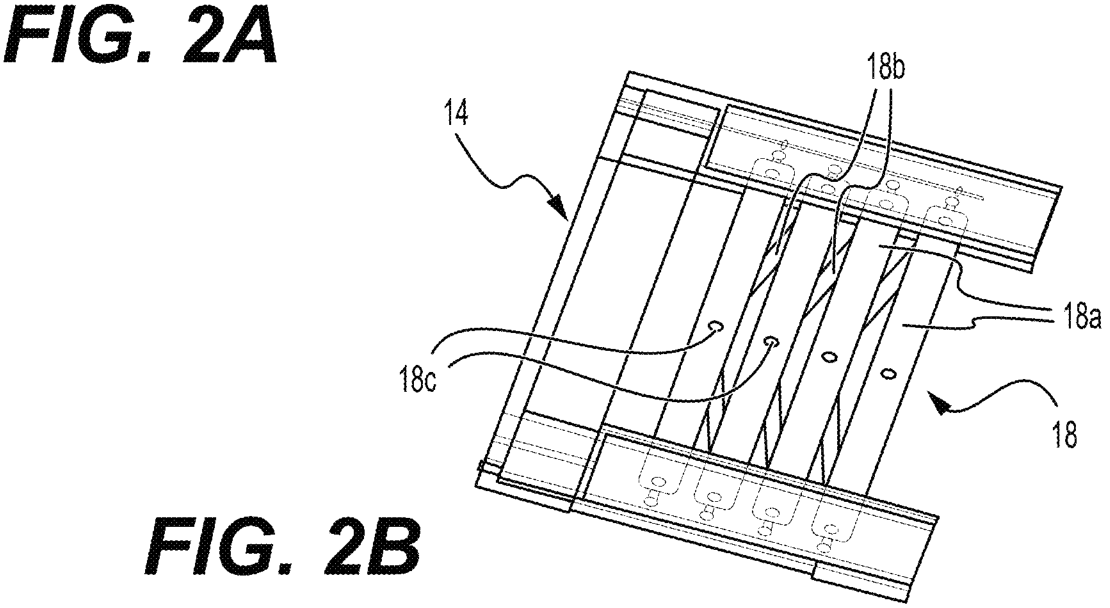
FIG. 2B is a top perspective view of the lower member of FIG. 2A, in which the base made up hinged plates and link members is in a deployed position.

As shown in FIG. 2B, the base 18 includes a plurality of plates 18*a*, each connected to adjacent plates by link members 18*b* and hinges 18*c*. The link members 18*b* and hinges 18*c* permit the plates 18*a* to be folded into the stowed position of FIG. 2A or extended into the deployed position of FIG. 2B. Retraction or extension of the base 18 may be accomplished automatically through motor power, or may be performed manually. When deployed, the plates 18*a* extend across the interior of the lower member 14 to create a stable mechanical surface upon which a load may be lowered.

Figure 2C:
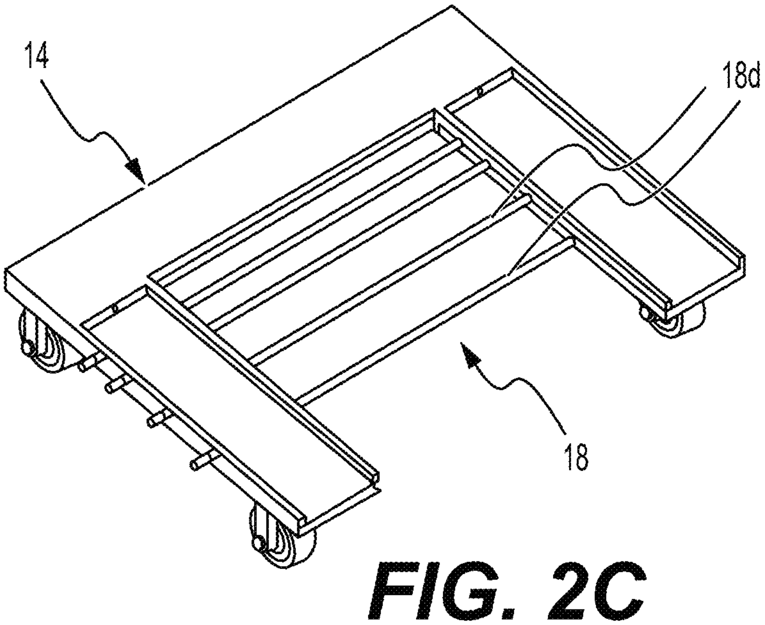
FIG. 2C is a perspective view of an embodiment of the lower member of FIG. 1A in which the base is formed of manually insertable support bars.

Referring now to FIG. 2C, in another embodiment, the base 18 may comprise a plurality of manually insertable bars 18*d* that are received in openings or channels within the lower member 14. The bars 18*d* may be installed once the metallic load has been elevated to a desired lifting height by the upper member. When the bars 18*d* are received within the lower member 14, a rigid mechanical support is formed beneath the lifted load. The electromagnets 20 can thereafter be deactivated and the load remains safely supported by the bars 18*d* without magnetic suspension.

Figure 3A:
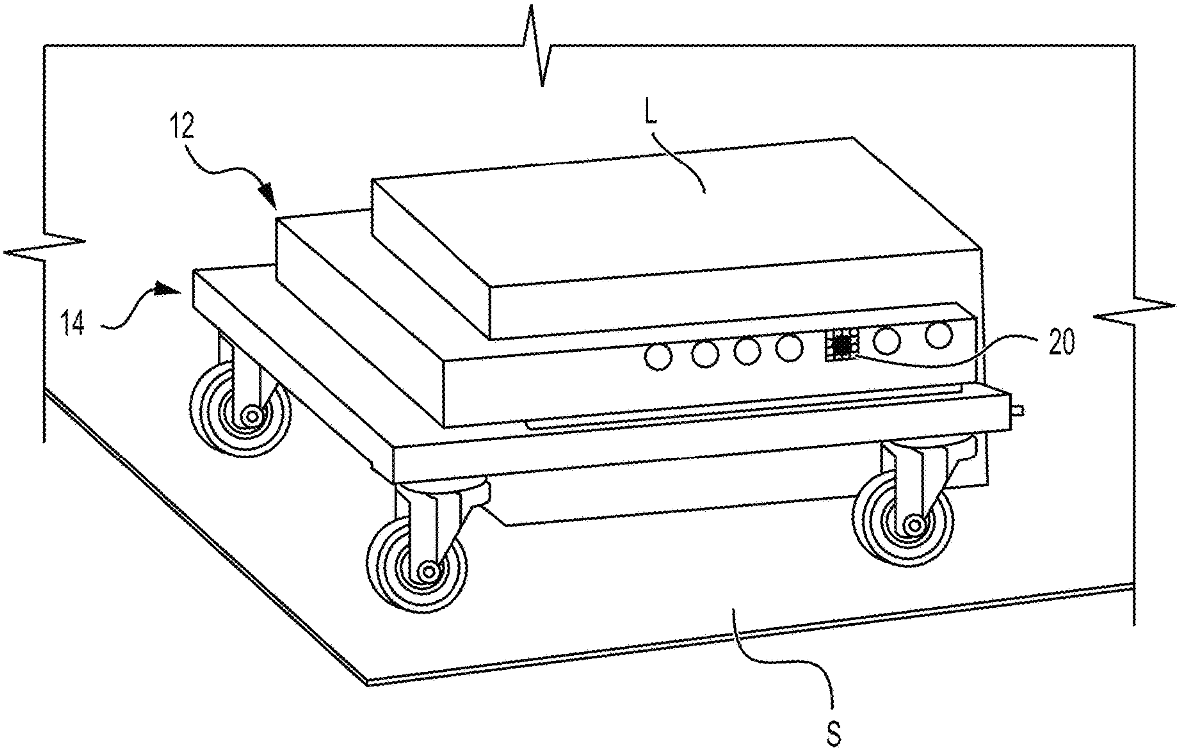
FIG. 3A is a perspective view of the electromagnetic lifting and transport device engaging a load in a lowered position.

Referring now to FIG. 3A, the device 10 may be positioned adjacent a weighted metallic load L located on a support surface S. The upper member 12 is adjusted into an engagement position relative to the load L. The electromagnets 20 are then energized to magnetically engage the load L, thereby temporarily lifting or suspending the load by the upper member 12 without requiring the manual insertion of forks or other lifting tools beneath the load L.

Figure 3B:
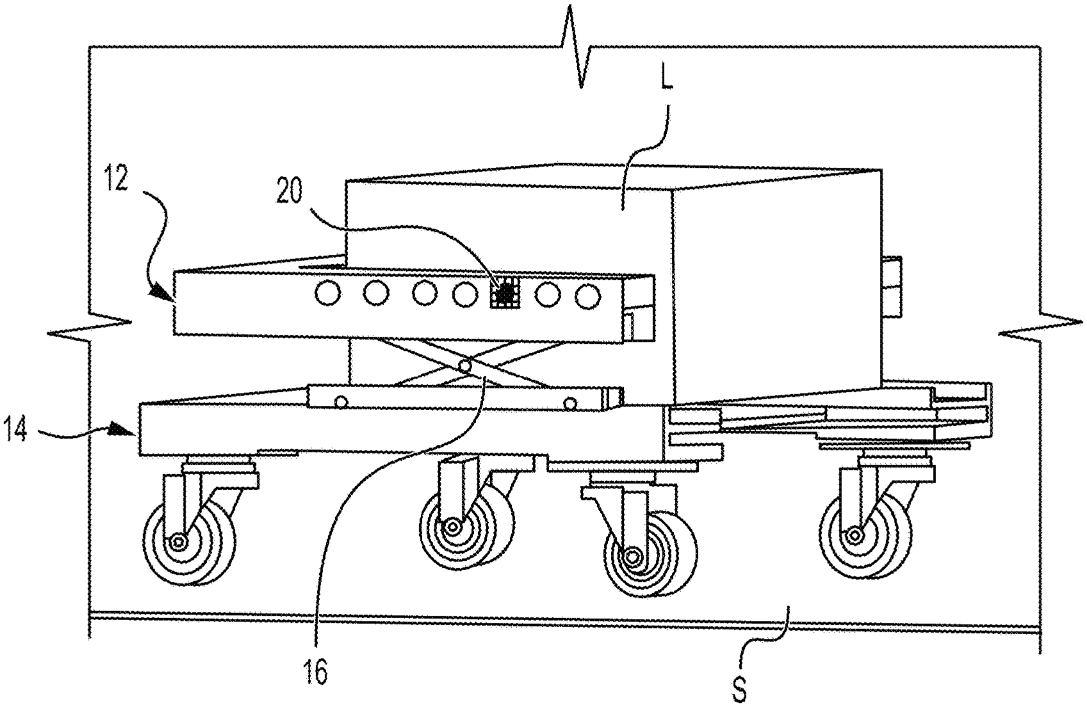
FIG. 3B is a perspective view of the electromagnetic lifting and transport device lifting a load to an elevated position.

Referring now to FIG. 3B, with the electromagnets 20 still energized, the lifting mechanism 16 raises the upper member 12 relative to the lower member 14 such that the load L is elevated above the lower member and the surrounding surface S. With the load elevated, the base 18 is transitioned from the stowed position to the deployed position beneath the load L (e.g., via plates 18*a* or bars 18*d*, depending on embodiment). The load L is then lowered onto the deployed base 18. Once the load is resting fully upon the base 18, the electromagnets 20 may be deactivated. The lower member 14, supported by movement means 14*d*, can then be used to transport the load to a desired location along the support surface S.

The disclosed lifting and transfer sequence eliminates the need to continuously suspend the load magnetically while transporting it. In the event of loss of electrical power, emergency stopping, or intentional deactivation, the load remains safely supported on the mechanical base 18. This device and method provide a safe and practical lifting solution in environments where conventional hoisting equipment is unavailable, forklifts cannot position their forks beneath a grounded load, or where uninterrupted electrical power cannot be guaranteed.

Figure 4:
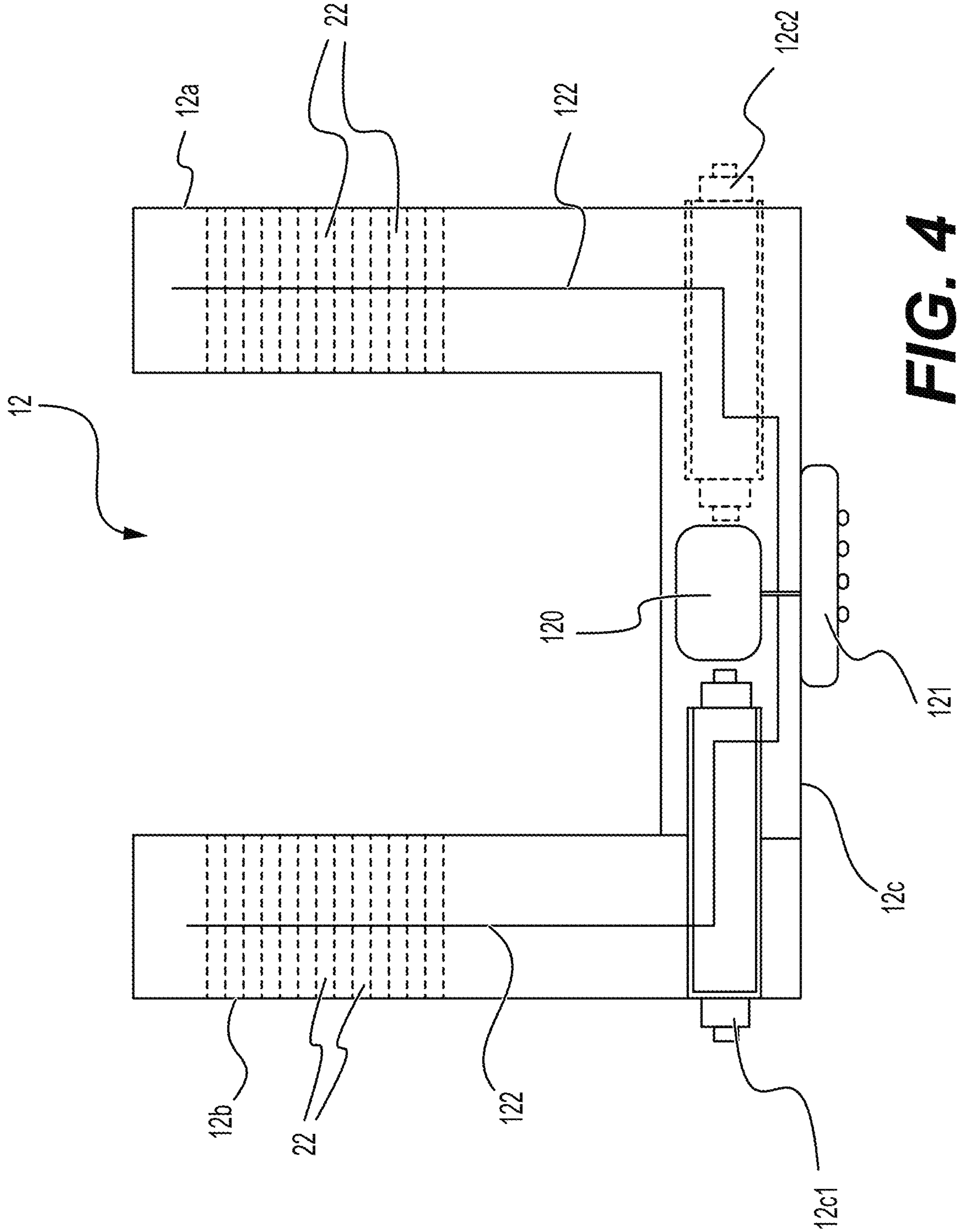
FIG. 4 is a schematic view of an upper member of the electromagnetic lifting and transport device, illustrating internal power and wiring, an onboard controller, and adjustment means for varying spacing between first and second upper members.

Referring now to FIG. 4, a non-limiting embodiment of the upper member 12 is shown schematically to illustrate internal power and control features. The transverse member 12*c* of upper member 12 includes adjustment means 12*cl* configured to vary the lateral spacing between the first upper member 12*a* and the second upper member 12*b*, and in some embodiments may further include an optional second adjustment means 12*c*2 to provide additional alignment or spacing control. Each of the respective first and second upper members 12*a*, 12*b* includes a plurality of slots 22 configured to receive electromagnets. A power supply 120 may be housed within the upper 12 and electrically coupled to an onboard controller 121. The onboard controller 121 may include a main power switch, an emergency stop switch, and independently controlled thermal cutoff devices for one or more electromagnets. Internal wiring 122 extends from the power supply 120 and controller 121 through the upper member 12, with electrical contacts provided within the slots 22 to enable selective electrical connection, energization, and control of electromagnets received therein.

In other embodiments, the power supply 120 and onboard controller 121 may be located partially or entirely within one or both of the first upper member 12*a* and the second upper member 12*b*, or remotely from the upper member 12. Power and control signals may be routed through flexible cabling, cable carriers, or wireless communication links. The onboard controller 121 may include programmable logic, microcontrollers, or other electronic control circuitry configured to independently energize, de-energize, or modulate individual electromagnets received within the slots 22. In some embodiments, sensors such as temperature sensors, current sensors, or load-detection sensors may be operatively coupled to the controller 121 to provide feedback-based control, fault detection, or safety interlocks.

It should be understood that the electromagnetic lifting and transporting device and methods of use thereof are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A lifting and transport device, comprising:

an upper member, wherein the upper member includes at least one electromagnet configured to magnetically support a weighted metal load;

a lower member, wherein the lower member includes means for movement along a support surface; and a lifting mechanism extending between the upper member and the lower member, wherein the lifting mechanism is configured to raise or lower the upper member in relation to the lower member while the at least one electromagnet is actively magnetically supporting the weighted metal load; and a base, wherein the base is configured to be arranged in a stowed or a deployed position within the lower member, and wherein the base is configured to support the weighted metal load in direct contact thereon when the base is in the deployed position.

2. The lifting and transport device of claim 1, wherein the upper member includes a first upper member, a second upper member, and a transverse upper member, wherein the transverse upper member extends between the first upper member and the second upper member.

3. The lifting and transport device of claim 2, wherein the transverse member includes means for adjusting a distance between the first upper member and the second upper member.

4. The lifting and transport device of claim 3, wherein the lower member includes means for lateral movement of the lifting mechanism.

5. The lifting and transport device of claim 2, wherein the first upper member and the second upper member each include a plurality of slots, wherein each slot of the plurality of slots are configured to hold the at least one electromagnet.

6. The lifting and transport device of claim 5, wherein the at least one electromagnet includes multiple electromagnets.

7. The lifting and transport device of claim 1, wherein the means for movement along the support surface comprises wheels.

8. The lifting and transport device of claim 1, wherein the lower member includes a first lower member, a second lower member, and a transverse lower member.

9. The lifting and transport device of claim 8, wherein the base comprises:

a plurality of plates extending between the first lower member and the second lower member; and hinged link members joining each plate of the plurality of plates to an adjacent plate, wherein the hinged link members are configured to retract or extend and thereby place the base into the stowed and deployed position, respectively.

10. The lifting and transport device of claim 1, wherein the at least one electromagnet is housed within a magnetic cup formed of a nickel-iron soft ferromagnetic alloy.

11. The lifting and transport device of claim 1, wherein the at least one electromagnet includes a cooling assembly comprising cooling fins and a fan configured to reduce thermal buildup during operation.

12. The lifting and transport device of claim 1, further comprising an emergency stop switch configured to immediately deactivate the at least one electromagnet.

13. The lifting and transport device of claim 1, wherein the lifting mechanism comprises a screw-driven actuator powered by a motor.

14. The lifting and transport device of claim 1, wherein the lifting mechanism comprises a hydraulic actuator or a pneumatic actuator.

15. The lifting and transport device of claim 1, wherein the upper member and the lower member each have a generally U-shaped configuration.

16. The lifting and transport device of claim 1, wherein the base comprises a plurality of manually insertable support bars configured to be received in openings in the lower member and configured to support the weighted load in the deployed position.

17. A lifting and transport device comprising:

a lower member including means for movement along a support surface;

an upper member positioned above the lower member and including at least one electromagnet configured to magnetically engage a metallic load, wherein the lower member and the upper member are U-shaped;

a lifting mechanism extending between the upper member and the lower member and configured to raise and lower the upper member; and a base, wherein the base is configured to be arranged in a stowed or a deployed position, and wherein the base is configured to support the metallic load in direct contact thereon when the base is in the deployed position.

18. The lifting and transport device of claim 17, wherein the upper member includes a plurality of slots, wherein each slot of the plurality of slots are configured to hold the at least one electromagnet.

19. A method of lifting and transporting a metal load, comprising:

providing a load, wherein the load is at least partially metallic and magnetic;

positioning a lifting and transport device such that an upper member of the device is adjacent the load;

activating at least one electromagnet in the upper member to magnetically engage the load;

raising the upper member relative to a lower member using a lifting mechanism, wherein the lifting mechanism extends between the upper member and the lower member;

extending a base underneath the load, wherein the base is supported by the lower member and is extended from a stowed position to a deployed position; and lowering the load directly onto the base while the base is in the deployed position.

20. The method of claim 19, further comprising moving the lifting and transport device with the load thereon along a support surface, wherein the lower member includes means for movement along the support surface.

* * * * *